3,208,522
METHOD OF TREATING SUBTERRANEAN FORMATIONS

Albert H. Roebuck, Fort Worth, Tex., and Robert L. Kendig, Ponca City, Okla., assignors to Continental Oil Company, Ponca City, Okla., a corporation of Delaware
No Drawing. Filed May 16, 1960, Ser. No. 29,171
1 Claim. (Cl. 166—29)

This invention relates to a method of treating subterranean formations to increase the production of fluids therefrom and particularly to the fracturing of unconsolidated or loosely consolidated formations.

The common practice for many years in the oil industry was to treat unconsolidated subterranean formations producing oil or gas with explosives in order that a well bore traversing the formation might be enlarged by the resultant cavity to allow replacement of part of the unconsolidated formation. Other methods were also utilized, such as acid treating, but these were mainly directed to increasing permeability in the formation immediately contiguous with the well bore.

Subsequent to the use of the above-mentioned methods, there was developed the now established operation of fracturing the formation. At the outset the fracturing fluids which were utilized were those having a high viscosity, such as jellied gasoline, but thereafter the fracturing processes were developed in order that lower viscosity liquids were capable of utilization. The generally accepted method of fracturing in the industry at the present time is to use a liquid of a relatively low viscosity containing propping particles entrained therein in order that the fracture which is established may be maintained during subsequent production steps.

The prior art has directed most of the efforts in the fracturing of formations to those subterranean formations wherein the permeability was too low to allow efficient production to be obtained or in formations containing permeability damage. The method of fracturing such formations has been developed so that the normally standard steps are to introduce fracturing fluid into the well hole, apply hydraulic pressure together with the hydrostatic pressure, and lift the strata by said pressure in order that a fracture is established. The fracture is subjected to a continued pressure until the fracture has propagated to a sufficient extent; and an amount of the propping materials, such as sand or the like, is deposited in the fracture in amounts to prevent the beds of the formation from closing immediately upon the reduction of the pressure upon the fracturing fluid. Thereafter the formation is returned to production, and the hydrocarbons from within the formation flow into and through the fracture which has been established and has the resultant increased permeability feature not found within the formation itself.

It is obvious that the prior art has been concerned with the fracturing of formations wherein the predominant difficulty is a formation having low permeability or a permeability block in the vicinity of the well bore and wherein it is necessary to establish a zone of permeability. There has been little consideration given to the fracturing of unconsolidated formations due to the fact that the propping sand embeds itself into the face of the fracture after the fracturing pressure is released, allowing the fracture to heal or close and loss of the feature of high permeability. The more recent development in the art of fracturing subterranean formations has been directional fracturing wherein the location and orientation of the fracture are determined by a preliminary step such as focused underreaming or the like.

Prior art treatment of such incompetent formations has been to consolidate them by the injection of plastics, silicate solutions, or the like in order that a degree of consolidation may be achieved in order to avoid the production of the unconsolidated particles of the formation. Other devices have been developed, such as sand strainers, traps, and the like, but a method of fracturing said formations has never been considered in the prior art to provide an increased permeability together with the desired formation control.

The object of the present invention is to provide a method for fracturing unconsolidated or loosely consolidated subterranean formations.

Another object of this invention is to provide a method of fracturing such an incompetent formation in order to obtain a degree of control of the unconsolidated or loosely consolidated formation.

A further object of this invention is to provide a permeable zone within the consolidated or loosely consolidated formation whereby the hydrocarbons may be recovered more efficiently.

Other objects and advantages of this invention will be apparent from the following description.

Briefly, this invention comprises a method of fracturing unconsolidated or loosely consolidated subterranean formations with a permeable cement slurry whereby a more permeable zone is defined and a degree of stability is provided for the incompetent formation.

The method of the present invention comprises several steps which will be set forth herein in describing the invention in detail, but it will be obvious to those skilled in the art that only a portion of the steps are necessarily basic to the invention. In a subterranean formation, which is composed of unconsolidated or loosely consolidated particles, production therefrom is concurrent with the accumulation of sand or other particles contained therein which slough into the well bore itself. The first step, therefore, is to condition the well bore and immediately surrounding formation by a cleanout, if such a condition exists. This step is unnecessary if the method is to be applied to a formation at the point of initial production. It will be obvious to those skilled in the art that it is necessary that steps be taken in order that the well bore will be in direct communication with the formation, either an open hole condition or through the tubing or casing by means of perforations or the like.

This invention may be applied in either a cased or uncased well bore, and the steps of the invention will be set forth herein as if applied to a cased well bore situation, though it will be obvious to those skilled in the art that certain of these steps will be unnnecessary or inapplicable in the event that the well bore is uncased.

Subsequent to the conditioning of the well bore, which is substantially identical to the conditioning necessary for a conventional fracturing operation as known in the art, the initial step is to provide a sufficient amount of a permeable cement slurry having the required characteristics of pumpability, etc., which will enable it to be injected with conventional oil field equipment.

The next step is to obtain an initial formation breakdown at the face of the formation adjacent the well bore at the desired depth to provide a wedge for the ensuing fracture. This is accomplished by increasing the pressure to the necessary amount and noting the breakdown as indicated by a substantial diminution of the pressure which indicates the occurrence of the initial breakdown. Thereafter the cement slurry is continuously introduced through the well bore by the application of sufficient hydraulic pressure to force the slurry into the formation whereby a fracture is defined within the formation. The application of pressure to the cement slurry causes the formation to separate into distinct strata, whereby the permeable cement is extended into the formation to a desired distance and configuration as may be determined and controlled by the amount of the pressure and volume of cement applied through the well bore. Thereafter the cement is retained in the formation by continuing the pressure for such a period as is necessary to allow the particular permeable cement to set.

Upon the expiration of the time required for a setting of the cement, the pressure is reduced; and the well bore can be returned to production, though it is preferable to remove or displace the cement from the well bore. This can be done by drilling with conventional means in order that the well bore is again free to allow less inhibited communication between the surface facilities and the formation. Thereafter surface communications are again established, and the well is returned to production by conventional means. The fracture provides a more uniformly permeable zone through which the hydrocarbons of the formation may be produced; and due to the rigidity of the permeable cement, it provides a degree of stability within the incompetent formation whereby the unconsolidated or loosely consolidated particles contained therein are prevented from causing a problem during the subsequent production phase, such as shifting or embedding and closing of the fracture.

The basic steps of the invention may be varied as the individual formation characteristics dictate, such as the utilization of conventional fracturing fluids prior to the application of the fracturing by the invention of the cement slurry in order that an initial formation breakdown fracture may be initiated by the conventional fluids. This step is of particular benefit in those formations, though incompetent, which are more consolidated in nature and provide such resistance that conventional pumping equipment is unable to supply the necessary pressures needed to initiate a breakdown fracture with a permeable cement slurry having lesser penetrating characteristics. Another variation of this initial breakdown fracturing phase may be the step of partially under-reaming, notching or other removal of a portion of the formation adjacent the well bore prior to the injection of the permeable cement slurry, such as with a hydraulic jet perforator.

It is anticipated that the necessary packing means may be incorporated into the application of this method to a well bore in those instances where one skilled in the art would necessarily know that conventional packing means would be desirable, such as in fracturing a formation which is at a depth other than at the bottom of the well bore or when a plurality of fractures is to be made at several different depths.

A further variation of the application of this invention is the utilization of a hydraulic fluid capable of conveying hydraulic pressure at the point of ultimate fracturing, whereby the accumulation of the cement slurry is avoided in the well bore itself. Conventional methods allow the desired amount of cement slurry that is needed in order to establish the fracture to be determined, and that amount of slurry is introduced into the formation. Thereafter the amount of conventional fluid necessary to displace all of the cement slurry from the well bore into the fracture is injected. This use of an alternate hydraulic fluid is applied in order to discharge the slurry completely into the formation and prevent the setting of cement plugs throughout the well bore.

The following examples are included for the purposes of illustration of the practice of the invention and are in no way to limit the claim.

Example I

The Miocene sand formation in Block 30 of Offshore Gulf of Mexico is traversed by a well to a depth of 6,670 feet said well bore being equipped with the requisite tubing and casing. The formation to be treated by the method disclosed above is located between 6,640 and 6,642 feet in depth, wherein the necessary casing perforations, etc., have been accomplished.

A volume of 5,000 gallons of permeable cement, prepared at the site in a conventional oil field cement mixer, having the requisite physical characteristics for cement as specified in API Code RP-10B was injected into the formation at a rate of three barrels per minute. The pressure was developed to 4,200 p.s.i., and a formation breakdown was indicated when the pressure decreased rapidly to 3,600 p.s.i., after which the remainder of the cement was pumped into place and maintained under pressure. The cement was allowed to set for 18 hours, whereafter the pressure being released, the well was prepared for production flow at the rate of 275 barrels of oil per day with no appreciable sand or particle production. Prior to the fracturing treatment, the well bore had been producing only 78 barrels per day, together with substantial amounts of sand, making frequent cleanout operations necessary.

Example II

A producing sand formation in the Warren McKee Field in Lea County, New Mexico, is traversed by a well to a depth of 9,200 feet, said well bore being equipped with the requisite tubing and casing. The formation to be treated by the method disclosed above is located between 9,115 and 9,135 feet in depth, wherein the necessary casing perforations, packer apparatus, etc., have been accomplished and installed. A portion of the casing and cement were removed to allow the face of the formation to be notched with a conventional hydraulic jet perforator, due to the fact that the formation was too consolidated for initial breakdown by the slurry otherwise due to the limited capacities of the pumping equipment.

A volume of 2,400 gallons of permeable cement, prepared at the site in a conventional oil field cement mixer, having the requisite physical characteristics for cement as specified in API Code RP-10B was injected into the formation and directed to the notched portion at a rate of three barrels per minute. The pressure was developed to 3,400 p.s.i., and a formation breakdown was indicated when the pressure decreased rapidly to 3,000 p.s.i., after which the remainder of the cement was pumped into place and maintained under pressure. The cement was allowed to set for 16 hours, whereafter the pressure being released, the well was prepared for production flow at the rate of 104 barrels of oil per day with no appreciable sand or particle production. Prior to the fracturing treatment, the well bore had been producing only 42 barrels per day together with substantial amounts of sand, making frequent cleanout operations necessary.

While particular embodiments of this invention have been described, it will be understood, of course, that the invention is not limited thereto, since many modifications may be made; and it is contemplated to cover by the appended claim any such modifications as fall within the true scope of the invention.

The invention having been thus described what is claimed and desired to be secured by Letters Patent is:

A method of treating a fluid-bearing subterranean formation traversed by a well bore which comprises:
 (a) Injecting a permeable cement slurry into said well bore;
 (b) Subjecting said slurry adjacent said formation to pressure sufficient to break down said formation;
 (c) Breaking down said formation adjacent said well bore, thereby initiating a fracture therein;
 (d) Displacing said slurry into said fracture, thereby substantially extending said fracture outwardly from said well bore;
 (e) Maintaining said slurry in said fracture until passage of sufficient setting time, whereby a set permeable cement occurs therein;
 (f) Terminating said pressure;

(g) Removing from said well bore the permeable cement remaining therein; and (h) Producing fluid from said formation through said permeable cement in said fracture through said well bore to the surface.

References Cited by the Examiner

UNITED STATES PATENTS

| | | | |
|---|---|---|---|
| 2,285,302 | 6/42 | Patterson | 166—12 |
| 2,368,424 | 1/45 | Reistle | 166—42 |
| 2,379,516 | 7/45 | Garrison. | |
| 2,749,988 | 6/56 | West | 166—42 |
| 2,758,653 | 8/56 | Desbrow | 166—42 |
| 2,786,531 | 3/57 | Mangold et al. | 166—12 |
| 2,823,753 | 2/58 | Henderson et al. | 166—29 |
| 2,986,538 | 5/61 | Nesbitt et al. | 166—12 |
| 3,044,550 | 7/62 | Eilers | 166—42.1 |

CHARLES E. O'CONNELL, *Primary Examiner.*

BENJAMIN BENDETT, BENJAMIN HERSH,
*Examiners.*